(12) United States Patent
Südow et al.

(10) Patent No.: US 8,319,497 B2
(45) Date of Patent: Nov. 27, 2012

(54) MARINE SENSOR STREAMER HAVING PRESSURE ACTIVATED STIFFNESS ENHANCEMENT

(75) Inventors: Gustav Göran Mattias Südow, Vällingby (SE); Ulf Peter Lindqvist, Segeltorp (SE); Andras Robert Juhasz, Hägersten (SE)

(73) Assignee: PGS Geophysical AS, Lysaker (NO)

( * ) Notice: Subject to any disclaimer, the term of this patent is extended or adjusted under 35 U.S.C. 154(b) by 297 days.

(21) Appl. No.: 12/798,581

(22) Filed: Apr. 7, 2010

(65) Prior Publication Data

US 2011/0248718 A1 Oct. 13, 2011

(51) Int. Cl.
*G01V 3/15* (2006.01)

(52) U.S. Cl. ......................................... 324/365; 324/347

(58) Field of Classification Search .................... 367/20, 367/150, 153; 324/365; 702/2, 6, 7; 174/14, 174/15.6, 15.7, 19, 47, 100, 113, 116; 138/113; 52/2.11

See application file for complete search history.

(56) References Cited

U.S. PATENT DOCUMENTS

| | | | |
|---|---|---|---|
| 4,481,611 A | 11/1984 | Burrage | |
| 6,239,363 B1 * | 5/2001 | Wooters | 174/47 |
| 7,446,535 B1 | 11/2008 | Tenghamn et al. | |
| 7,545,703 B2 * | 6/2009 | Lunde et al. | 367/20 |
| 7,548,486 B2 | 6/2009 | Tenghamn | |
| 7,573,781 B2 * | 8/2009 | Fernihough et al. | 367/20 |
| 7,602,191 B2 | 10/2009 | Davidsson | |
| 7,671,598 B2 | 3/2010 | Ronaess et al. | |
| 7,693,005 B2 | 4/2010 | Stenzel et al. | |
| 2009/0140741 A1 | 6/2009 | Tenghamn et al. | |
| 2010/0017133 A1 | 1/2010 | Ziolkowski et al. | |
| 2010/0045296 A1 | 2/2010 | Tenghamn | |

FOREIGN PATENT DOCUMENTS

| EP | 2204673 A2 | 7/2010 |
|---|---|---|
| WO | 2009032274 A1 | 3/2009 |

OTHER PUBLICATIONS

Grasp the World of Tomorrow Liquid Crystal Technology, Vectran, Jun. 12, 2008.

* cited by examiner

*Primary Examiner* — Reena Aurora
*Assistant Examiner* — Christopher McAndrew

(57) ABSTRACT

A marine sensor streamer includes a jacket covering an exterior of the streamer. At least one strength member extends the length of the jacket. At least one stiffener element extends inside the length of the jacket. The at least one stiffener element includes a gas filling the interior of a flexible, compressible tube and filler elements disposed in the gas. The filler elements have exterior shape and surface roughness such that upon compression of the gas, the filler elements are urged into contact with each other, causing the streamer to become substantially rigid.

9 Claims, 4 Drawing Sheets

MARINE SENSOR STREAMER HAVING PRESSURE ACTIVATED STIFFNESS ENHANCEMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine geophysical survey apparatus and methods. More specifically, the invention relates to structures for marine sensor streamers that can be deployed by spooling from a vessel-borne winch or reel.

2. Background Art

In a marine geophysical survey, a survey vessel travels on the surface of a body of water such as a lake or the ocean. The survey vessel typically contains geophysical acquisition control equipment, which includes devices such as navigation control, seismic and/or electromagnetic energy source control, and sensor signal recording devices. The source acquisition control equipment causes an energy source towed in the body of water, by the survey vessel or another vessel, to actuate at selected times. The source may be any type well known in the art of seismic acquisition, including seismic air guns or water guns, arrays of air guns, electrodes, wire coils, magnetometers, etc. Sensor streamers, also called sensor cables, are elongate cable-like structures that are towed in the body of water by the survey vessel or by another vessel. Typically, a plurality of sensor streamers is towed behind the survey vessel laterally spaced apart from each other. The streamers contain sensors to detect the energy wavefields initiated by the energy source and reflected from formation boundaries in the subsurface Earth formations below the water bottom.

The geophysical sensors are typically located at regular intervals along the length of streamers. The streamers may also include electronic components, electrical wiring and may include other types of sensors. The streamers are typically assembled from sections, each section being approximately 75 meters in length. A number of such sections are joined end to end, and can extend the assembled streamer to a total length of many thousands of meters. Position control devices, such as depth controllers, paravanes, and tail buoys may be affixed to the streamer at selected positions and are used to regulate and monitor the movement of the streamer in the water. During operation, the streamers are typically submerged at a selected depth in the water of five to several hundred meters.

Deploying the streamers from the survey vessel is typically performed by unspooling the streamers from one or more winches disposed on the survey vessel. It is desirable that the streamers are relatively flexible during spooling and unspooling to facilitate such action. During operation in the water, however, it is desirable for the streamers to be relatively resistant to flexure, compression and extension so as to reduce the amount of noise induced in the sensors.

SUMMARY OF THE INVENTION

A marine sensor streamer includes a jacket covering an exterior of the streamer. At least one strength member extends the length of the jacket. At least one stiffener element extends inside the length of the jacket. The at least one stiffener element includes a gas filling the interior of a flexible, compressible tube and filler elements disposed in the gas. The filler elements have exterior shape and surface roughness such that upon compression of the gas, the filler elements are urged into contact with each other, causing the streamer to become substantially rigid.

Other aspects and advantages of the invention will be apparent from the following description and the appended claims.

DETAILED DESCRIPTION

Figure 1:
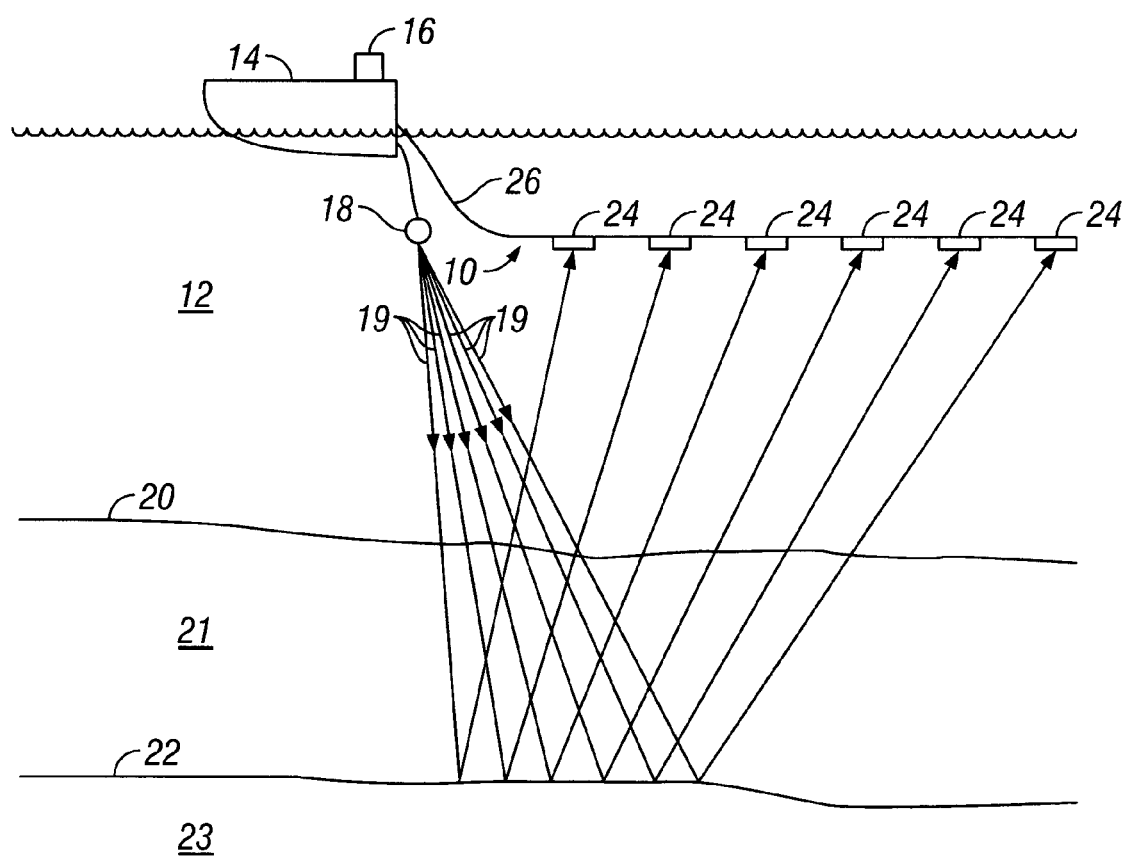
FIG. 1 shows typical marine geophysical data acquisition using a streamer according to one embodiment of the invention.

FIG. 1 shows an example marine geophysical data acquisition system as it is typically used on acquiring geophysical data such as seismic data or electromagnetic data. The present example will be explained with reference to electromagnetic sensing devices. A survey vessel 14 moves along the surface of a body of water 12 such as a lake or the ocean to conduct a marine geophysical survey. The marine geophysical survey is generally intended to detect and record geophysical signals related to structure and composition of various subsurface rock formations 21, 23 below the water bottom 20. The survey vessel 14 may include source actuation, data recording and navigation equipment, shown generally at 16 and referred to for convenience as a "recording system." The survey vessel 14, or a different vessel (not shown), can tow one or more geophysical energy sources 18, e.g., electromagnetic transmitters such as spaced apart electrodes along an insulated cable, or wire loops or coils at the end of such a cable. The survey vessel 14 or a different vessel tows at least one sensor streamer 10 at a selected depth in the water 12. The streamer 10 is coupled to the vessel 14 by a lead in cable 26. A plurality of sensor elements 24, or arrays of such sensor elements, may be disposed at spaced apart locations along the streamer 10. The sensor elements 24 may be formed by mounting a geophysical sensor such as an electrode pair or magnetometer, for example, inside a respective sensor holder. The sensor holders will be further explained below.

During operation, certain equipment (not shown separately) in the recording system 16 causes the source 18 to actuate at selected times. When actuated, the source 18 produces energy 19, e.g., an electromagnetic field, that emanates generally outwardly from the source 18. The energy 19 travels downwardly, through the water 12, and passes, at least in part, through the water bottom 20 into the rock formations 21, 23 below. The energy 19 is at least partially reflected from one or more electrical impedance boundaries 22 below the water bottom 20, and travels upwardly whereupon it may be detected by the sensor in each sensor element 24. Structure and composition of the rock formations 21, 23, among other properties of the Earth's subsurface, can be inferred by travel time of the energy 19 and by characteristics of the detected energy such as its amplitude and phase.

Figure 2:
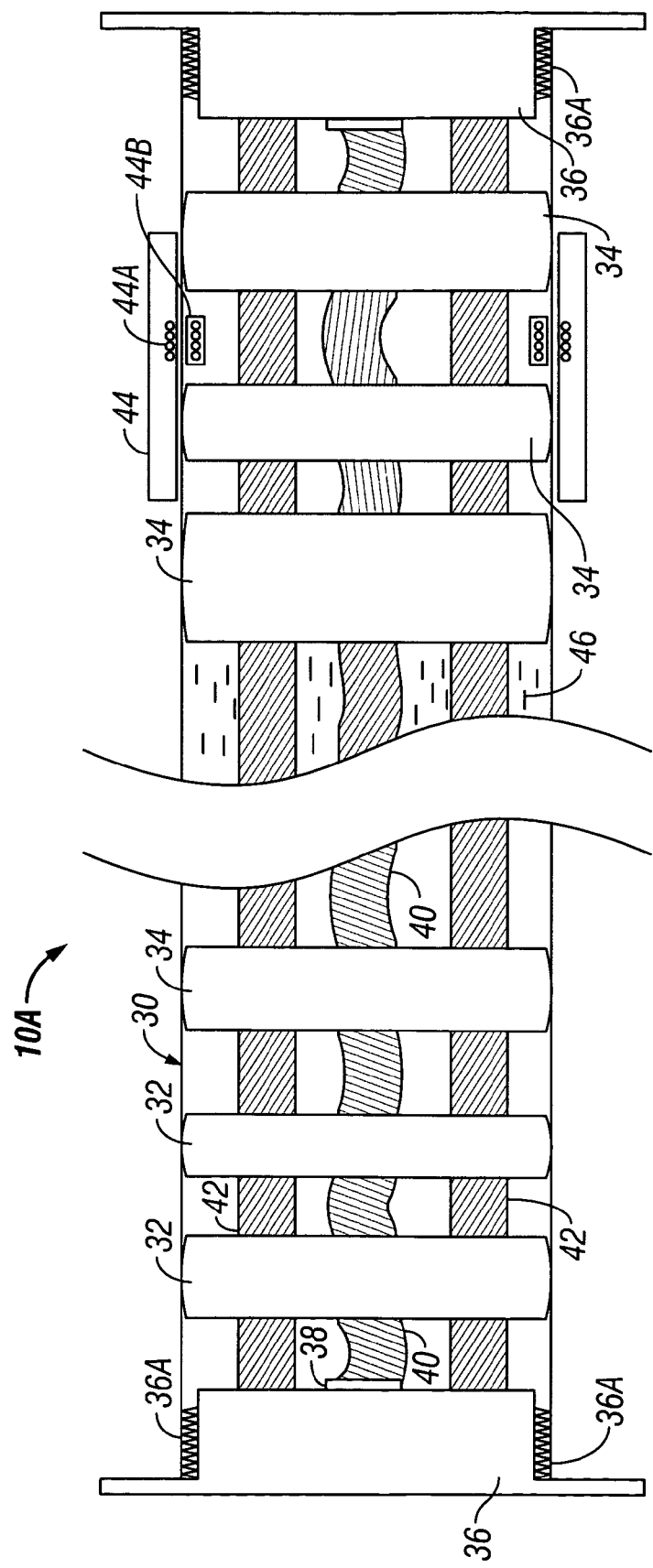
FIG. 2 shows a cut away view of one embodiment of a prior art streamer segment.

Having explained the general method of operation of a marine geophysical sensor streamer, an example embodiment of a prior art streamer will be explained with reference to FIG. 2. The purpose for explaining the prior art streamer structure in FIG. 2 is to more clearly show the differences between prior art streamer construction and examples of a streamer according to the invention, which will be explained below with reference to FIG. 5. FIG. 2 is a cut away view of a portion (segment) 10A of a typical marine streamer (10 in FIG. 1). A streamer as shown in FIG. 1 may extend behind the survey vessel (14 in FIG. 1) for several kilometers, and is typically made from a plurality of streamer segments 10A, as shown in FIG. 2 connected end to end behind the vessel (14 in FIG. 1).

The streamer segment 10A may be about 75 meters overall length. A streamer such as shown at 10 in FIG. 1 thus may be formed by connecting a selected number of such segments 10A end to end. The segment 10A includes a jacket 30, which can be made from 3.5 mm thick transparent polyurethane and can have a nominal external diameter of about 62 millimeters. In each segment 10A, each axial end of the jacket 30 may be terminated by a coupling/termination plate 36. The coupling/termination plate 36 may include rib elements 36A on an external surface of the coupling/termination plate 36 that is inserted into the end of the jacket 30, so as to seal against the inner surface of the jacket 30 and to grip the coupling/termination plate 36 to the jacket 30 when the jacket 30 is secured thereto by and external clamp (not shown). In the present example, two strength members 42 are coupled to the interior of each coupling/termination plate 36 and extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination plates 36 are coupled together using any suitable connector, so that the axial force is transmitted through the coupling/termination plates 36 from the strength members 42 in one segment 10A to the strength member in the adjoining segment.

The strength members 42 may be generally circular in cross section and are attached to a number of buoyancy spacers 32 disposed in the jacket 30. The buoyancy spacers 32 are coupled to the strength members 42 at spaced apart locations along the length of the strength members and laterally displaced from the center of the buoyancy spacers 32. The buoyancy spacers 32 may be made from foamed polyurethane or other suitable, selected density material. The buoyancy spacers 32 have a density and number selected to provide the streamer segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water.

The streamer segment 10A includes a generally centrally located conductor cable 40 which can include a plurality of insulated electrical conductors (not shown separately), and may include one or more optical fibers (not shown). The cable 40 conducts electrical and/or optical signals from the sensors (not shown in FIG. 2) to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 (not shown separately) will not experience any substantial axial stress when the streamer 10 is towed through the water by a vessel. The conductors and optical fibers may be terminated in a suitable connector 38 disposed in each coupling/termination plate 36 so that when the segments 10A are connected end to end as explained above, corresponding electrical and/or optical connections may be made between the electrical conductors and optical fibers in the conductor cable 40 in adjoining segments 10A.

Some types of sensors can be disposed inside sensor holders, shown in FIG. 2 generally at 34. At selected positions along the streamer a geodetic direction sensor called a "compass bird" 44 may be affixed to the outer surface of the jacket 30. The compass bird 44 includes a directional sensor (not shown separately) for determining the geographic orientation (magnetic compass direction) of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

The sensor holders 34 are typically molded from a rigid, dense plastic to better protect the geophysical sensors therein from damage during handling and use. The strength members 42 are typically tightly fit in, and adhesively bonded to through passages (not shown) in the sensor holders 34. If sensors are disposed in sensor holders 34, the sensors may be wire loops or coils configured to detect the magnetic field component of the electromagnetic field emanating from the subsurface, or the sensors may be magnetometers. If electrodes (FIG. 5) are used to detect electric field components of the electromagnetic field, they typically will be disposed outside the jacket 30 and have electrical connections through the jacket 30 to the interior of the streamer. The latter will be explained with reference to FIG. 5.

Figure 3:
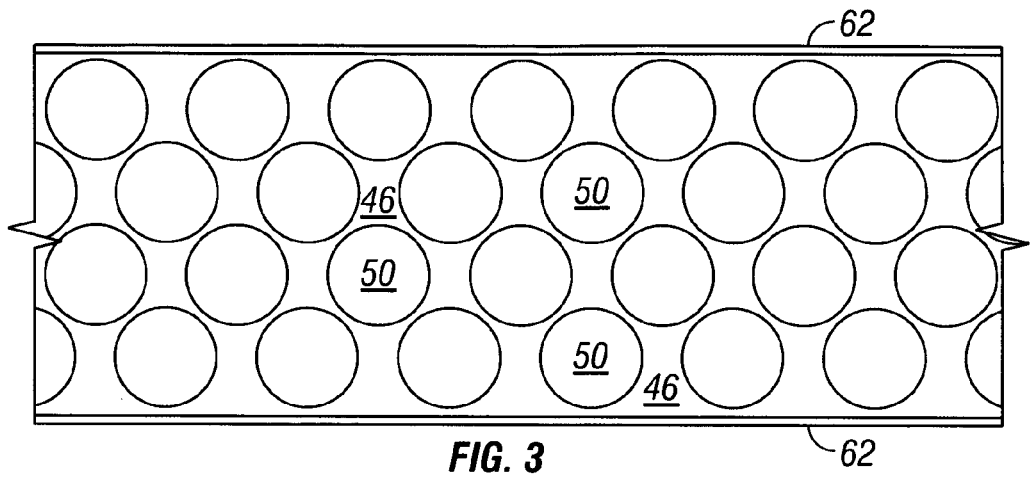
FIG. 3 shows filler elements suspended in gas in a tube at atmospheric pressure.

In the present invention, the streamer includes at least one stiffener element. FIG. 3 shows an example of one of the stiffener elements. A tube 62 made from a flexible, compressible material may have gas 46 in its interior. The gas 46 may have suspended therein filler elements 50. The filler elements 50 may be substantially spherically shaped, ovoidally shaped, or have similar shape, and occupy such amount of the void space inside the tube 62 such that when the tube 62 is exposed to external hydrostatic pressure in the water (12 in FIG. 1), e.g., when the streamer is suspended at a selected operating depth, the gas 46 will compress, enabling the filler elements 50 to be urged into contact with each other. The outer surface of each of the filler elements 50 should be sufficiently rough so as to inhibit relative motion between filler elements 50 as a result of friction when the elements 50 are urged into contact with each other. Example materials for the filler elements 50 include plastic such as polypropylene. The filler elements 50 preferably are substantially solid, but in some examples may include enough entrapped air, gas or other low density material so as to substantially avoid frictional contact therebetween when there is substantially no hydrostatic pressure applied to the streamer.

Figure 4:
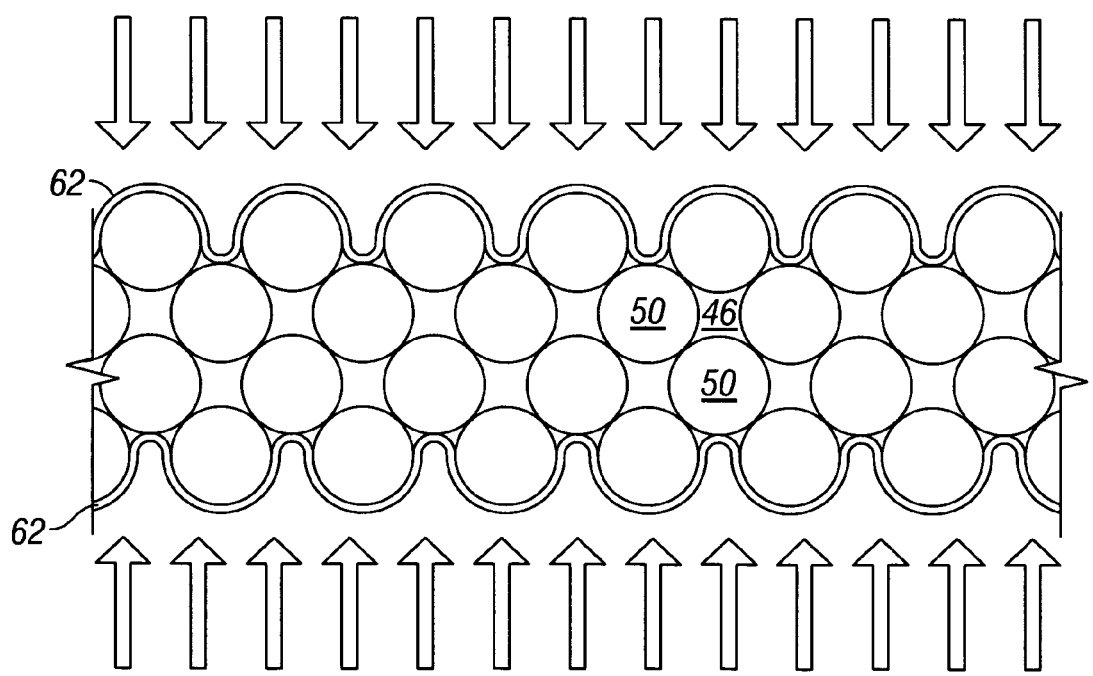
FIG. 4 shows the filler elements of FIG. 3 when the tube is exposed to hydrostatic pressure.

The filler elements 50 thus cause the streamer to become substantially rigid when the streamer is exposed to external hydrostatic pressure. When the hydrostatic pressure is relieved by lessening the depth of the streamer, however, the streamer once again becomes flexible. FIG. 4 shows the filler elements 50 urged into contact with each other when the streamer is hydrostatically compressed.

Figure 5:
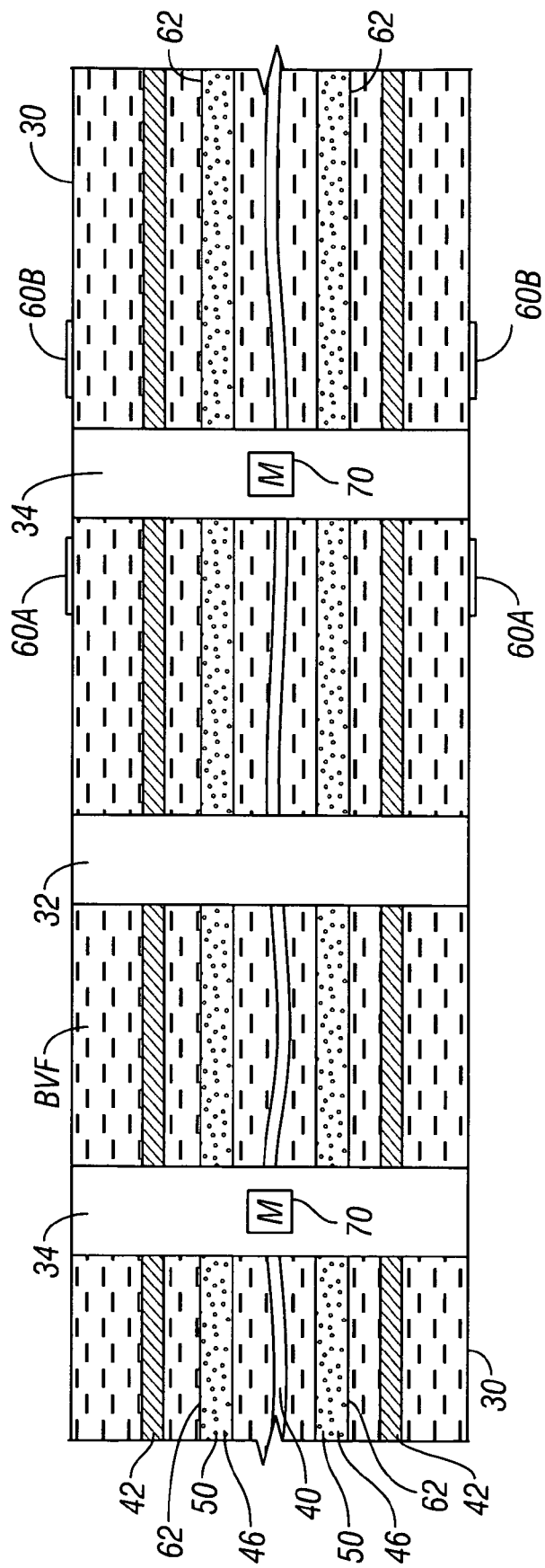
FIG. 5 shows a streamer having example stiffening members according to the invention.

In an example of a streamer, and referring to FIG. 5, a marine geophysical streamer may include the components described above with reference to FIG. 2, including the jacket 30, strength members 42, buoyancy spacers 32 and sensor holders 34 disposed inside the jacket 30. In the present example, two stiffener elements may be disposed inside the jacket 30 and extend the length of the streamer. The stiffener elements each include a flexible, compressible tube 62 filled with gas 46 and filler elements 50 as described above with reference to FIGS. 3 and 4. The example shown in FIG. 5 will have the filler elements 50 in the tube 62 in each stiffener element urged into frictional contact with each other under hydrostatic pressure. Under hydrostatic pressure, the stiffener elements, and thus the streamer becomes substantially rigid; when the hydrostatic pressure is relieved, the streamer again becomes flexible. The present example shows two stiffener elements, however other implementations may use other numbers of stiffener elements.

In the present example, the void space inside the jacket 30 may be filled with oil, kerosene, or preferably a curable gel-like buoyancy void filler BVF. The void filler BVF may be a curable, synthetic urethane-based polymer. The void filler BVF in its uncured state is essentially in liquid form. Upon cure, void filler the BVF no longer flows as a liquid, but instead becomes substantially solid. However, the void filler BVF upon cure retains some flexibility to bending stress, substantial elasticity, and freely transmits electromagnetic energy to electromagnetic sensors such as magnetometers or wire coils 70 disposed in certain sensor holders 34. It should be understood that the void filler BVF used in the present example is only one example of a gel-like substance that can be used to fill the interior of the streamer. Other materials could also be used. For example, heating a selected substance, such as a thermoplastic, above its melting point, and introducing the melted plastic into the interior of the jacket 30, and subsequent cooling, may also be used in a streamer according to the invention. In the present example, one or more pairs of spaced apart electrodes 60A, 60B may be disposed on the outside of the jacket 30 and electrically connected to suitable conductors in the cable 40, or processing circuitry (not shown) in the streamer. The electrode pair(s) may be used to detect electric field components of the electromagnetic field from the subsurface.

Streamers made according to the various aspects of the invention will be relatively flexible at atmospheric pressure, thereby making deployment and retrieval easier. Under hydrostatic pressure, streamers made according to the invention may become substantially rigid, thereby reducing noise induced in the geophysical sensors as a result of towing the streamer in the water.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine sensor streamer, comprising:
a jacket covering an exterior of the streamer;
at least one strength member extending the length of the jacket;
at least one stiffener element extending inside the length of the jacket, the at least one stiffener including a gas filling the interior of a flexible, compressible tube and filler elements disposed in the gas, the filler elements having exterior shape and surface roughness such that upon compression of the gas, the filler elements are urged into contact with each other, causing the streamer to become substantially rigid.

2. The streamer of claim 1 wherein upon decompression of the gas, the filler elements disengage from contact, and the streamer becomes substantially flexible.

3. The streamer of claim 1 wherein the at least one strength member comprises woven fiber.

4. The streamer of claim 1 further comprising buoyancy spacers disposed along the at least one strength member and inside the jacket at spaced apart locations, the spacers having a density selected to provide the streamer with a selected overall density.

5. The streamer of claim 4 wherein the buoyancy spacers comprise foamed polyurethane.

6. The streamer of claim 1 further comprising at least one sensor holder disposed inside the jacket and coupled to the at least one strength member.

7. The streamer of claim 1 wherein a sensor disposed in the sensor holder comprises at least one of a magnetometer and a wire loop.

8. The streamer of claim 1 further comprising at least one spaced apart pair of electrodes disposed on an outer surface of the jacket.

9. The streamer of claim 1 further comprising a material filling void spaces inside the jacket, the material introduce in liquid form and curable to become a flexible solid.

* * * * *